United States Patent
Nierescher et al.

(10) Patent No.: US 6,204,632 B1
(45) Date of Patent: Mar. 20, 2001

(54) APPARATUS FOR CHARGING MULTIPLE BATTERIES

(75) Inventors: David S. Nierescher, Newcastle; Walter A. van Schalkwijk, Issaquah; Robert M. Paratore, Woodinville, all of WA (US)

(73) Assignee: Selfcharge, Redmond, WA (US)

( * ) Notice: Subject to any disclaimer, the term of this patent is extended or adjusted under 35 U.S.C. 154(b) by 0 days.

(21) Appl. No.: 09/392,232

(22) Filed: Sep. 8, 1999

(51) Int. Cl.[7] ........................................................ H02J 7/00
(52) U.S. Cl. .......................... 320/116; 320/106; 320/110; 320/111; 320/113; 439/951
(58) Field of Search ................................... 320/106, 110, 320/113, 125; 439/951

(56) References Cited

U.S. PATENT DOCUMENTS

| | | | |
|---|---|---|---|
| 3,696,283 | * 10/1972 | Ackley, III ............................ | 320/110 |
| 4,229,686 | 10/1980 | Mullersman et al. . | |
| 4,232,260 | * 11/1980 | Lambkin ............................... | 320/110 |
| 4,608,528 | 8/1986 | Stillwell . | |
| 4,739,242 | * 4/1988 | McCarty et al. ..................... | 320/110 |
| 5,028,859 | * 7/1991 | Johnson et al. ...................... | 320/125 |
| 5,148,094 | * 9/1992 | Parks et al. .......................... | 320/110 |
| 5,162,719 | * 11/1992 | Tomura et al. ....................... | 320/110 |
| 5,222,670 | 6/1993 | Huang . | |
| 5,243,269 | 9/1993 | Katayama et al. . | |
| 5,280,229 | * 1/1994 | Faude et al. ......................... | 320/110 |
| 5,347,208 | * 9/1994 | Iida ...................................... | 320/113 |
| 5,369,352 | 11/1994 | Toepfer et al. . | |
| 5,592,064 | 1/1997 | Morita . | |
| 5,640,069 | * 6/1997 | Nissen ................................. | 315/219 |
| 5,648,712 | * 7/1997 | Hahn ................................... | 320/113 |
| 5,656,914 | * 8/1997 | Nagele et al. ....................... | 320/110 |
| 5,679,017 | * 10/1997 | Smith .................................. | 439/172 |
| 5,686,808 | * 11/1997 | Lutz .................................... | 320/110 |
| 5,729,115 | * 3/1998 | Wakefield ........................... | 320/110 |
| 5,734,253 | * 3/1998 | Brake et al. ......................... | 320/125 |
| 5,742,149 | * 4/1998 | Simpson .............................. | 320/110 |
| 5,926,005 | * 7/1999 | Holcomb et al. ................... | 320/107 |
| 6,002,237 | * 12/1999 | Gaza .................................... | 320/116 |
| 6,014,010 | * 1/2000 | Yao ...................................... | 320/110 |
| 6,018,227 | * 1/2000 | Kumar et al. ....................... | 320/106 |

FOREIGN PATENT DOCUMENTS

2702129C2    7/1983  (DE) .

* cited by examiner

*Primary Examiner*—Peter S. Wong
*Assistant Examiner*—Pia Tibbits
(74) *Attorney, Agent, or Firm*—James L. Davison

(57) ABSTRACT

A modular battery charging system is provided in two main embodiments. In a first embodiment, the modular battery charging system includes a power supply, an elongated track, a connector, and at least one battery charging module. The power supply converts an outlet alternating current voltage supply to a stepped-down direct current voltage supply of an amount equal to or less than about 30 volts. The elongated track includes a number of conductive strips, interfitting with each other. The battery charging module includes a housing, a charging unit supported within the housing, a number of electrical connection components to contact the track strips and to extend to the charging unit, and a battery device receiving port to receive the particular battery device in need of charging. In a second embodiment, the modular battery charging system includes a power supply and one or more battery charging module modules. The battery charging module modules include a housing having an electrical input port and an electrical output port, a charging unit positioned and supported within the housing, and a number of electrical connection components. During use, the electrical input port of a first battery charging module is connected directly to the power supply output port, and the electrical input ports of additional battery charging module modules are connected directly to the previous battery charging module electrical output port. In this manner a train of battery charging module modules is formed, headed by a single power supply.

17 Claims, 7 Drawing Sheets

APPARATUS FOR CHARGING MULTIPLE BATTERIES

FIELD OF THE INVENTION

The present invention relates to battery chargers, and more particularly, to battery charging devices for use with batteries and/or battery packs having diverse configuration and charging requirements.

BACKGROUND OF THE INVENTION

Many devices on the market today require batteries for their power source. Each of these devices may impose their own requirements on the battery, for instance, the batteries form factor, voltage and charge delivering capability. There are many examples of devices that require non-standard batteries such as cellular phones and notebook computers. Often the battery is externally attached to the device and become part of its ornamental design. Some devices, such as a family of power tools, share a common battery pack with a proprietary form factor. Allowing a device to only accept a battery pack with a non-standard form factor ensures that batteries used in a device will meet the requirements of the device. For these reasons, and many others, the manufactures of devices will often design a battery (or battery pack) in tandem with the device.

For each specially designed battery, however, a corresponding battery charger generally has to be designed that will accept both the form factor of the battery and charge the battery in a manner that it requires. Since many battery chargers step down line voltage to a low voltage that can be used to charge the battery, the use of line voltage imposes a requirement on the manufacturer that the battery charger be certified safe by a certification authority such as Underwriter's Lab (UL). The battery charger is often designed near the end of the development cycle once the design of the battery is known, even though certification requirements for the battery charger may unnecessarily delay the introduction of the device.

The myriad of configurations of battery chargers provided to accommodate the various known battery shapes, sizes, and load capabilities is potentially burdensome for a user of the device. Unfortunately, because there are so many different types of battery chargers, it is not unusual for a person to own multiple battery charging devices—one being required for each unique battery configuration. This is both expensive for the user and inefficient in space and outlet usage. The cost to the manufacturer for complying with the certification requirements for a battery charger is also unnecessarily expensive and time consuming.

Thus, a need exists for a new battery charging system that reduces the need for a user to buy multiple battery charging devices, reduces the space and outlet usage associated with operating the battery charging device, and reduces the manufacturer's cost and lead time in designing and producing and battery charging devices. The present invention is directed to fulfilling these needs and others as described below.

SUMMARY OF THE INVENTION

In accordance with the present invention, a modular battery charging system is provided. The modular battery charging system comprises a power supply module which electrically couples to one or more battery charging modules. Two embodiments for realizing this invention are described herein. In a first embodiment, the modular battery charging system includes a power supply, an elongated track, a power connector for electrically coupling the power supply to the elongated track, and at least one battery charging module. The power supply converts a line voltage from a standard electrical outlet to a stepped-down voltage that may be used to charge batteries directly, or may be further stepped down by the battery charging modules. The stepped down voltage produced by the power supply is at or below the voltage level for which certification is required from a certification authority (approximately 30 volts or less). The elongated track has conductive track strips extending longitudinally along the track. The battery charging module electrically interconnects with the track strips by way of the power connector.

In one arrangement, the battery charging module includes: a housing; a charging unit positioned and supported within the housing; a number of electrical connection components arranged to inter-couple the track strips and the charging unit; and a receiving port configured to receive a battery's form factor and provide the electrical connections necessary for coupling the battery to the charging unit.

A second embodiment is provided having a power supply module and one or more battery charging modules. Each battery charging module includes a housing having an electrical input port and an electrical output port, a charging unit positioned and supported within the housing, and a number of electrical connection components. The electrical components include a first connection extending between the electrical input port and the electrical output port. A second connection extends between the first connection and the charging unit, thereby placing the charging unit in a parallel arrangement with the first connection. During use, the electrical input port of a first battery charging module is connected directly to the power supply output port, and the electrical input port of additional battery charging modules are connected directly to the previous battery charging module electrical output port. In this manner a "train" of battery charging modules is formed, headed by a single power supply module.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In general, the present invention is a modular battery charging system for charging a plurality of different battery types (including "battery packs") having various sizes, shapes, and charging requirements. The modular battery charging system provides a power supply module that accepts line voltage and supplies a low voltage power source to a plurality of battery charging modules. The low voltage provided by the power supply module to the battery charging modules is below a level that requires safety certification by a regulatory agency so that only the power supply module need be certified. Each battery charging module is adapted to accommodate the form factor of the battery (e.g., the size, shape, and electrical connection requirements of the battery) and an internal charging unit may adapt the manner in which power is supplied to the battery based on the particular charging requirement of a battery type (e.g., a voltage and/or charging algorithm suitable for the battery).

Figure 1:
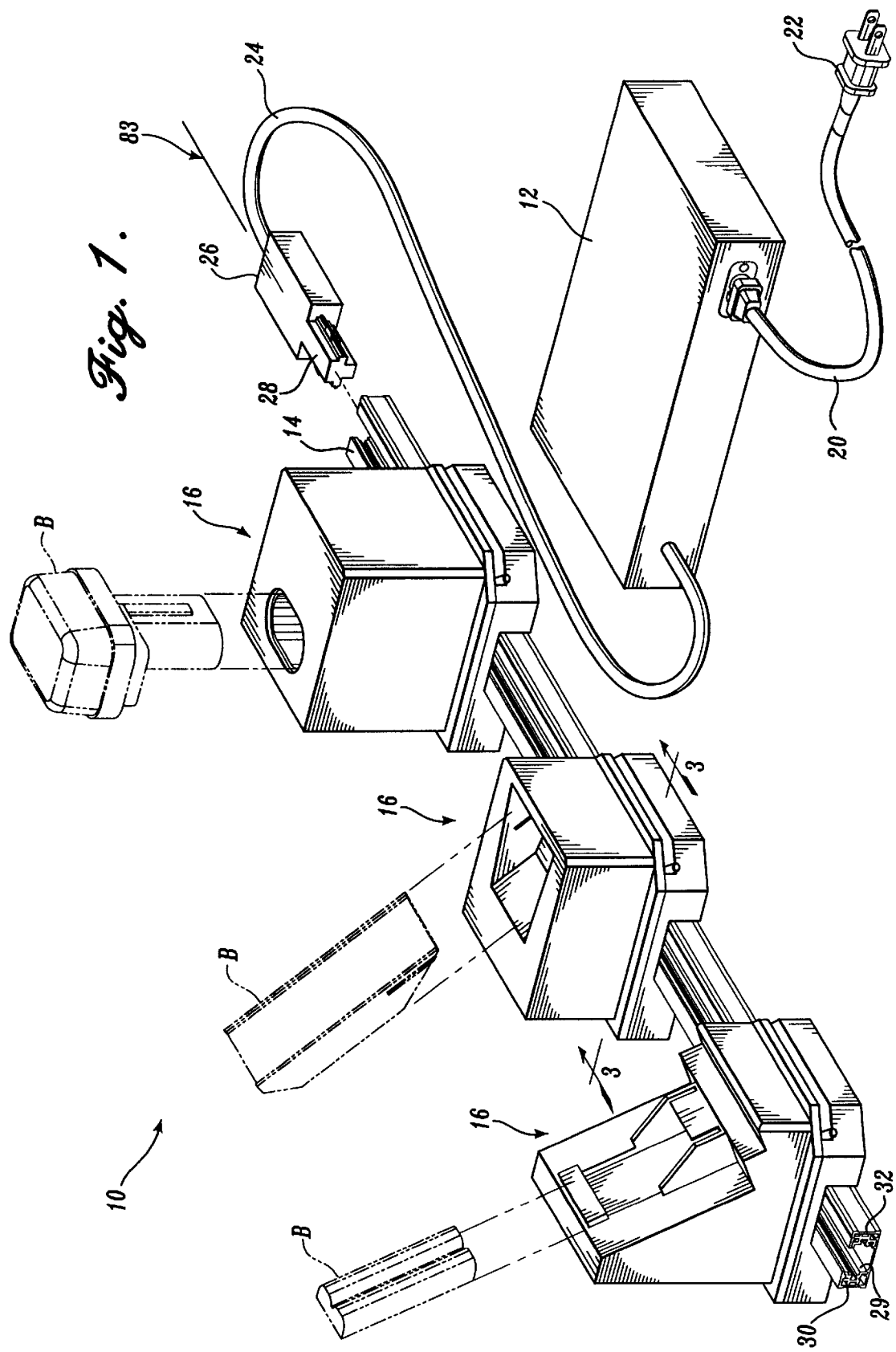
FIG. 1 is a perspective view of one embodiment of a modular battery charging system formed in accordance with the present invention.
Figure 2:
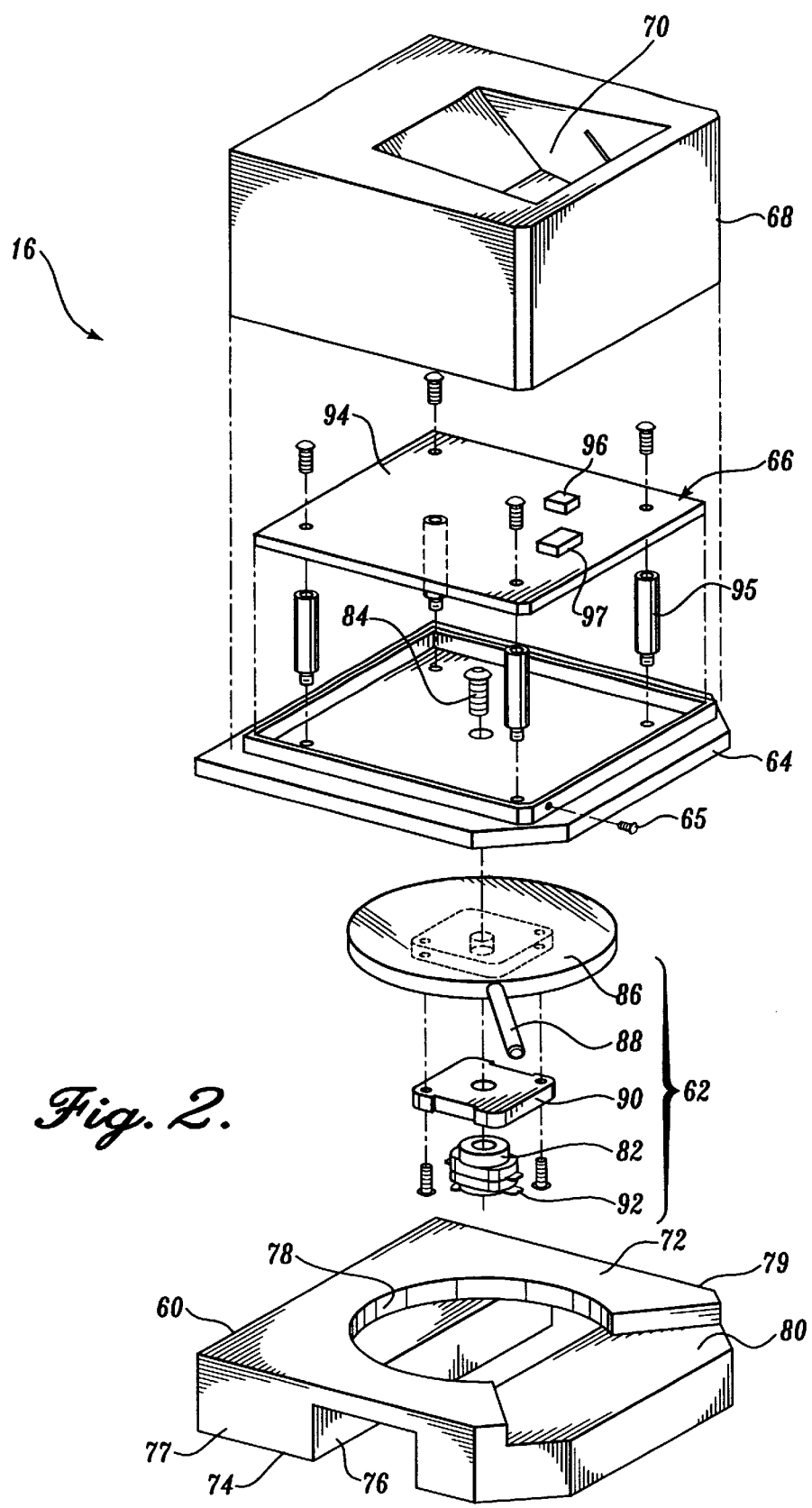
FIG. 2 is an exploded perspective view of one embodiment of a battery charging module formed in accordance with the present invention.
Figure 3:
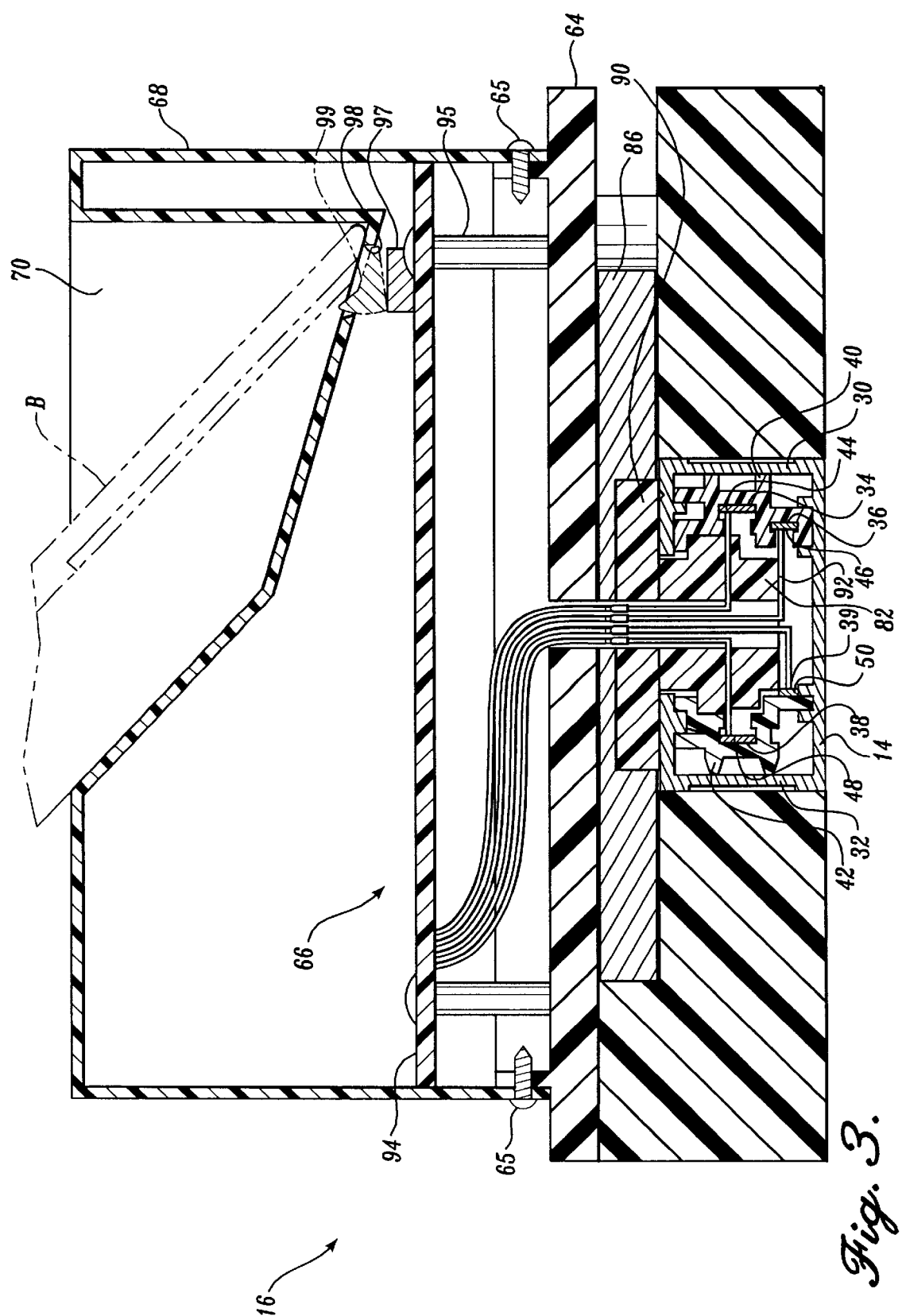
FIG. 3 is a cross-sectional side view taken along line 3—3 in FIG. 1.

In one embodiment, presented with reference to FIGS. 1–3, the modular battery charging system uses a power supply module that attaches to a track. Multiple battery charging modules are mechanically and electrically coupled to the track so as to draw power from the power supply module as required by that particular battery type. In a second embodiment, presented with reference to FIGS. 6 and 7, the modular battery charging system includes a power supply module and one or more battery charging modules. The battery charging modules are formed to connect end-to-end first with a power supply module and then with other battery charging modules, thus forming an extendible "train" of battery charging modules headed by a single power supply module. Within each battery charging module are electrical connections and circuitry that extend between a connection at either end of the module that maintains each battery charging module in a parallel electrical relationship with its adjacent battery charging module.

In more detail, referring to FIG. 1, a first embodiment of a modular battery charging system 10 includes a power supply module 12, a track 14, and a number of battery charging modules 16. Various styles of batteries and/or battery packs, B, are shown in phantom ready to be inserted into a matching battery charging module 16. The power supply module 12 includes conventional components to accept a line voltage from a utility outlet (e.g., a household outlet at approximately 120 V) via an power cable 20 with an outlet plug 22 at a distal end. The power supply module 12 outputs a stepped-down voltage supply in the range of about 28 VDC.

The outlet plug 22, power cable 20, and power supply module 12 are certified, as required, by an authority such as Underwriter's Lab (UL). Because the power supply module 12 provides an output below the threshold above which certification is required (about 30 volts), battery charging modules 16 connected to the power supply module's 12 low-side should not require UL certification. The power supply module 12 preferable includes a current-limiting circuit to ensure that the current output by the power supply module 12 to a plurality of battery charging modules does not exceed a safe level. The power supply module 12 provides low voltage power through an output cable 24 having power connector 26 at the output cable's 24 distal end. The power connector 26 includes a mating member 28 adapted to engage one end of the track 14. In an alternative arrangement (not shown), there are multiple output cables 26 available from the power supply module 12 to provide power to multiple tracks 14.

Referring to FIGS. 1 and 3, in one embodiment, the track 14 is an elongated U-shaped member with a center channel 29 defined between upright walls 30, 32. One or more longitudinal grooves 34, 36, 38, 39 are formed in the upright walls 30, 32. The track of FIGS. 1 and 3 is preferably formed of a structurally rigid material, such as metal or plastic. Because metal is generally conductive, when metal is used to construct the track, a number of panels 40, 42 are positioned along each channel upright wall 30, 32. The longitudinal grooves 34, 36, 38, 39 are formed in the panels 40, 42, whereas when plastic or similar material is used the longitudinal grooves 34, 36, 38, 39, may be formed as part of the actual track upright walls 30, 32. In either case, the longitudinal grooves are electrically isolated from each other by non-conductive materials.

As shown best in FIG. 3, the longitudinal grooves 34, 36, 38, 39, contain conductive strips for electrically coupling the battery charging modules 16 to the power supply module 12. For instance, panel 40 includes a conductive potential strip 44 in one groove 34 and a ground strip 46 in another groove 36. The opposite panel 42 includes first and second communications data bus strips 48, 50 in grooves 38, 39 respectively. The communication data bus strips 48, 50 are optional, but are preferred so as to provide for various status and control options for "smart" batteries known in the art. The track 14 includes a proximal end arranged to mate the conductive strips 44, 46, 48, 50 with corresponding contacts on the power supply connector 26. In the embodiment of FIG. 1, the connector mating member 28 is formed as a male component laterally insertable between the panels 40, 42 at the track proximal end. The connector mating member 28 includes a potential line, a ground line, and a number of communication data lines (e.g., two lines to support a I$^2$C bus), each located to engage its respective track strip during use 44, 46, 48, 50.

Referring to FIG. 2, each battery charging module 16 includes a lateral base 60, connection components 62, an internal support shelf 64, a charging unit 66, a housing 68, and a battery device receiving port 70. The connection components 62 mechanically and electrically engage the battery charging module 16 with the track 14. The receiving port 70 is configured to accept a particular battery's size and shape and to also position electrical contacts where they can engage electrical connections provided by the battery. The charging unit 66 may directly couple the battery B inserted in the receiving port 70 to the power supply 12 through the track 14 and the connection components 62, or the charging unit 66 may adapt the power provided by the power supply to suit the charging requirements of the particular battery B. For instance, the battery may require that the voltage be stepped down below that supplied by the power supply. The charging unit 66 may also be "intelligent" in that it uses active components (e.g., item 96) such as a microprocessor or other logic circuit to charge the battery according to a charging algorithm associated with the battery or the battery's chemistry. Many charging algorithms are suitable to be implemented by the charging unit 66. As the charging algorithms are well known in the art, they will not be discussed further. In short, each battery charging module 16 is mechanically and electrically formed to address the particular charging requirements of the battery for which the battery charging module 16 is provided.

In the embodiment illustrated in FIG. 2, the connection components 62 are supported by the lateral base 60 for rotational movement. The lateral base 60 includes an upper surface 72 and a lower surface 74. A slot 76 is formed in the lower surface. The slot 76 extends from one side 77 of the lateral base 60 to the opposite side 79. The slot 76 is sized to fit around the track 14. A circular well 78 is formed in the base upper surface 72. The circular well 78 extends downward to the elevation of the slot 76 so that the slot 72 may be accessed from above the lateral base 60 via the well 78. The base 60 further includes an arcuate cutout 80 in the base upper surface. The arcuate cutout 80 extends from side 77 to the opposite side 79 of the upper surface 72.

The connection components 62 illustrated in FIG. 2 include an upright plug 82, a circular disk 86 with a handle 88, and a square plate 90. The plug 82 is affixed to the plate 90. The plate 90 is held in a recessed portion of the underside of the circular disk 86. A central axle 84 extends through the internal support shelf 64, the circular disk 86, the square plate 90, and the plug 82.

When assembled, the circular disk 86 fits into the lateral base well 78, with the handle 88 extending out the arcuate cutout 80. Rotating the handle 88 causes the circular disk 86, the square plate 90, and the plug 82 to rotate as a single unit about the central axle 84. The plug 82 includes four flat blades 92 that extend from opposite sides of the plug—two to each side. The blades 92 are located, and the plug 82 is shaped, such that in one position the plug 82 will fit between the track panels 40, 42 with the blades 92 oriented parallel to a longitudinal axis 83 (FIG. 1) inside the channel 29; and in a second position, the blades 92 will be transverse to the longitudinal axis 83. By first placing the blades parallel, the battery charging module 16 may be positioned about the track 14 and the plug 82 into the channel 29. Once so placed, the handle 88 is rotated to force the blades 92 to engage the conductive strips 44, 46, 48, 50 in the various grooves. In this second position, the connection components are effectively "locked" or seated into the track providing both a mechanical and electrical connection between the charging module 16 and the track 14.

Referring to FIG. 3, the support shelf 64 is connected to the base 60 using conventional fasteners. The charging unit 66 may include a circuit board 94 connected to the support shelf by way of threaded spacers 95 preferably positioned a distance upward from the support shelf 64. This allows air to circulate about, and to cool, the underside of the circuit board 94. Depending on the heat generated by the charging unit 66, the air cooling should help to extend the life of the battery charging module 16. A number of electrical wires connect between the plug prongs 92 and the circuit board 94 through the central axle 84.

The charging unit 66 includes a number of conventional electronic battery charging components (e.g., resistors, voltage regulators, diodes, transistors, etc.) that modify and/or regulate the voltage and/or current provided to the battery by way of contact pads 97 (FIG. 3). The circuit board 94 optionally includes a microprocessor 96 or other type of logic circuit to perform various functions, such as performing charging algorithms suitable for the battery being charged by that battery charging module 16. The contact pads 97 are provided along the upper surface of the circuit board 94 and are positioned so as to mate with contact pads 99 provided by the battery type to be charged in that particular battery charging module.

Referring back to FIG. 2, the battery receiving port 70 is provided in the housing 68 and is sized and shaped to engage the form factor of a particular battery or battery pack B. The housing 68 encompasses the charging unit 66 and connects to the support shelf 64. The arrangement of the housing 68, the charging unit 66, and an opening 98 in the receiving port 70 (see FIG. 3) is such that when a battery device B is inserted into the receiving port 70, its associated charging pads 99 will properly engage the contact pads 97 exposed via the opening 98.

Figure 4:
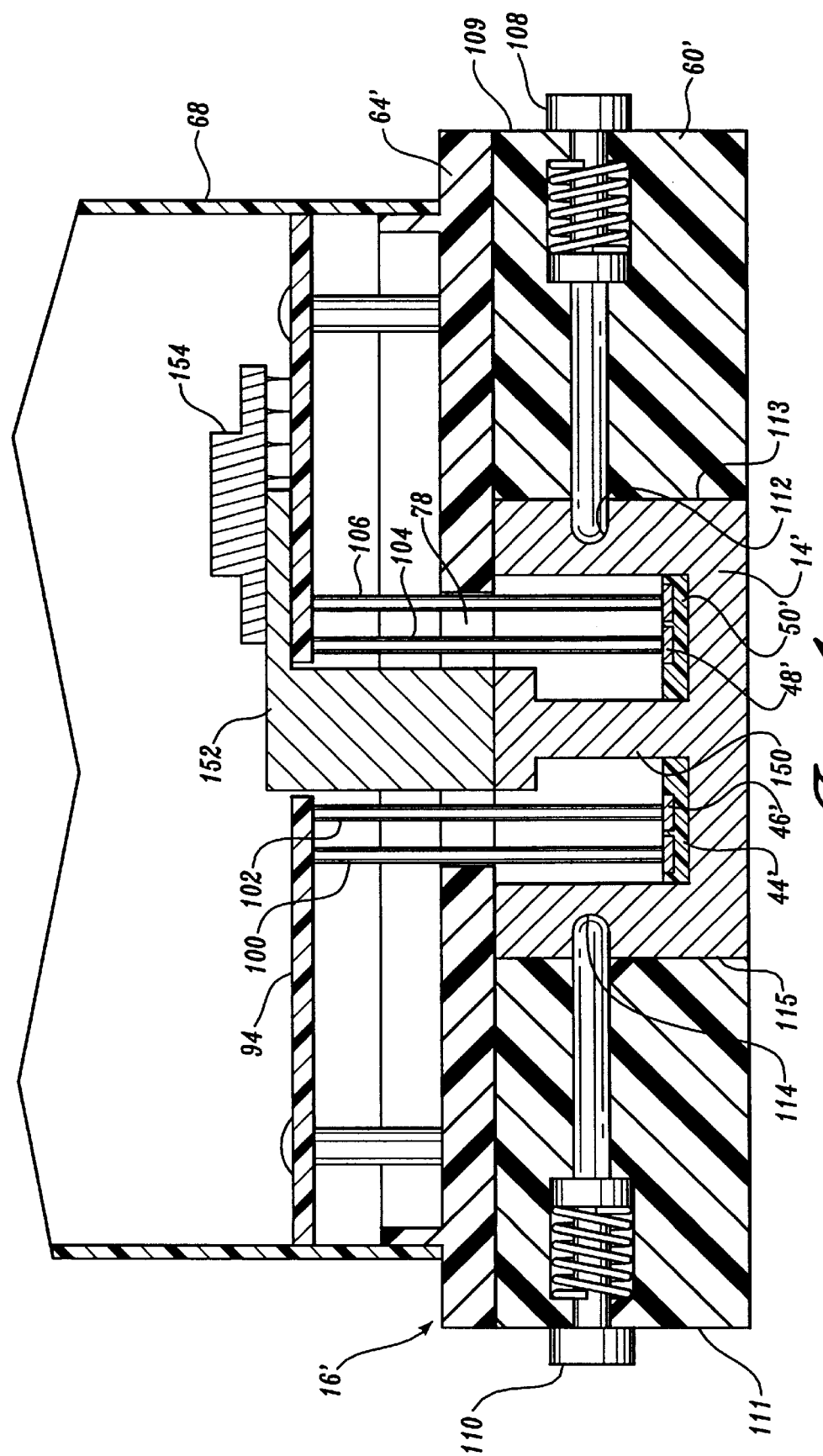
FIG. 4 is a cross-sectional side view of an alternative battery charging module contact arrangement formed in accordance with the present invention.

The connection components 62 described with reference to FIGS. 1–3 provide one arrangement that may be used to connect the charging unit 66 of the battery charging module 16 with the track 14. Numerous other arrangements are possible by modifying either or both the connection components 62 or the shape of the track 14. For example, FIG. 4 illustrates an alternative arrangement of a battery charging module 14' for use with an alternative track 16'. Instead of having the conductive strips 44, 46, 48, 50 located in side wall grooves of the track U-shaped channel, the contact strips 44', 46', 48', 50' are positioned in the lower interior surface of the track's U-shaped channel. A plurality of pogo pin connectors 100, 102, 104, 106 are attached to the circuit board 94 and positioned to engage these conductive strips 44', 46', 48', 50'. The pogo pin connectors 100, 102, 104, 106 extend downward from the circuit board 94 into the track channel, to touch the contact strips 44', 46', 48', 50' during use. Instead of the connector components 62 providing the mechanical connection between the battery charging module 16' and the track 14', a number of inwardly-biased pins 108, 110 extend through the battery charging module 16' base side surfaces 109, 111 and into pin holes 112, 114 formed in the track exterior side surfaces 113, 115, thereby keeping the battery charging module 16' secured to the track 14'.

Figure 5:
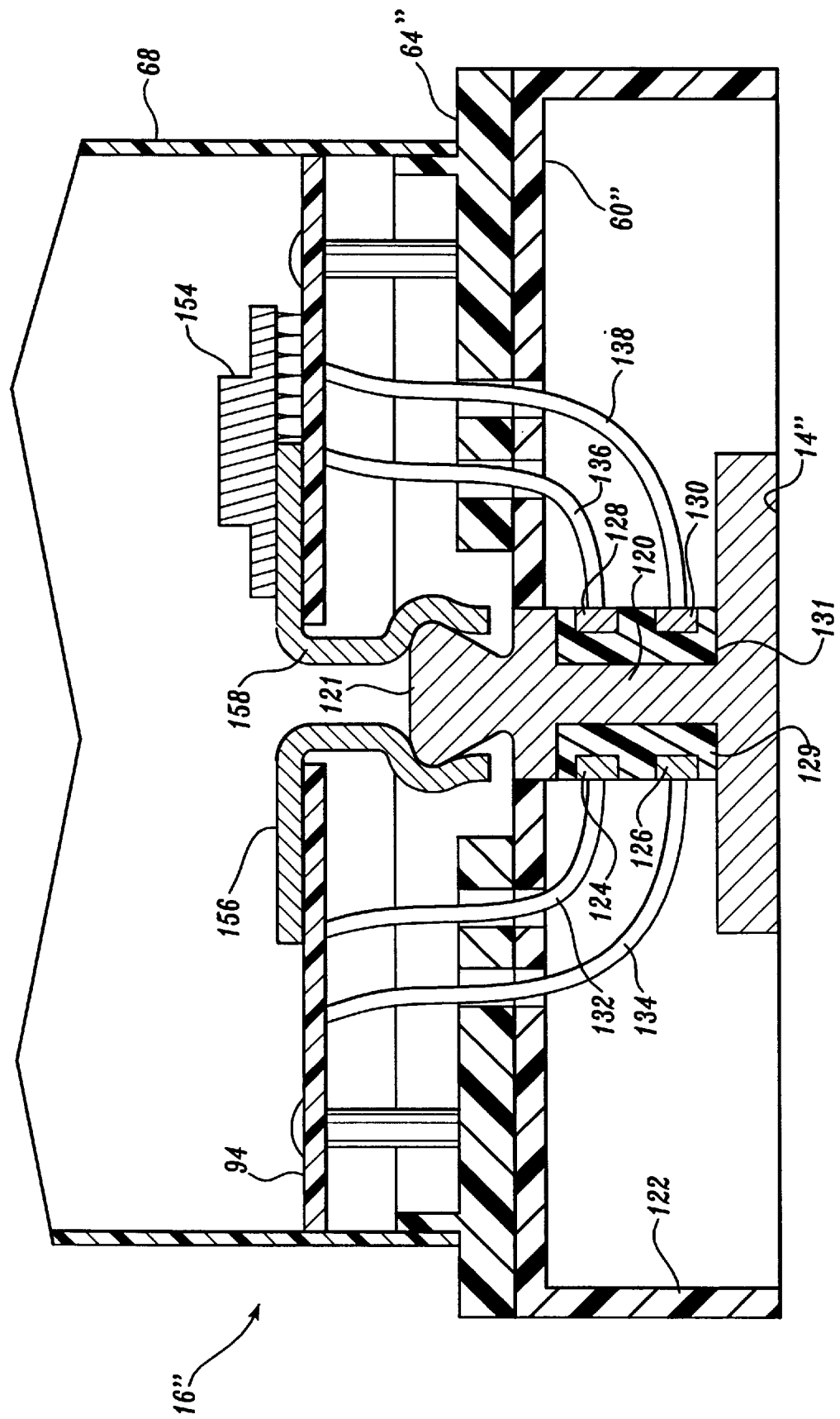
FIG. 5 is a cross-sectional side view of yet another alternative battery charging module contact arrangement formed in accordance with the present invention.

FIG. 5 illustrates yet another arrangement that may be used to connect charging components 66 of a battery charging module 16" with a track 14". In this arrangement, the track 14" includes an upright wall 120 insertable into a cavity 122 formed in the underside of the lateral base plate 60" of the batter charging module 66". Connection components 132, 134, 136, 138, 156, and 158 of the battery charging module are clamped about the track 14" instead of being inserted into the track. Various conductive strips 124, 126, 128, 130 are placed on the upright wall sides in insulated panels 129, 131. The conductive strips 124, 126, 128, 130 are engaged by interconnecting electrical wires 132, 134, 136, 138 formed as springs that descend from the circuit board 94 to the contact strips 124, 126, 128, 130. Alternatively, the base 60" may present a panel parallel to the vertical wall 120 with corresponding contacts that engage contact strips 124, 126, 128, 130 when the base 60" is slid over the track 14". The battery charging module 16" is mechanically secured to the track 14" by connection members 156 and 158 which deform while they slide over and then engage a head portion 121 of the vertical wall 120 when the base 60" is placed onto the track 14".

Because the charging unit will sometimes use components such as voltage regulators or transistors 154 that need more active cooling that can be provided by air circulation, it may be preferable to include a heat sink as part of the charging unit'. The head sink surface area may be advantageously increased by coupling a heat sink member made from metal to a track. In FIG. 4, an upright longitudinal center column 150 is formed in the track. A metal heat transfer member 152 is connected to a circuit board component 154 and is sized and placed to extend through the support shelf 64' to directly contact the track longitudinal center column 150. In FIG. 5, the upright wall upper end 121 is extended up through the support shelf 64". As mentioned above, a pair of opposed clamp arms 156, 158 snap over the wall upper end while also serving as heat sink members, e.g., arms 156 and 158 are connected to the power transistor 154 located on the circuit board 94.

Figure 6:
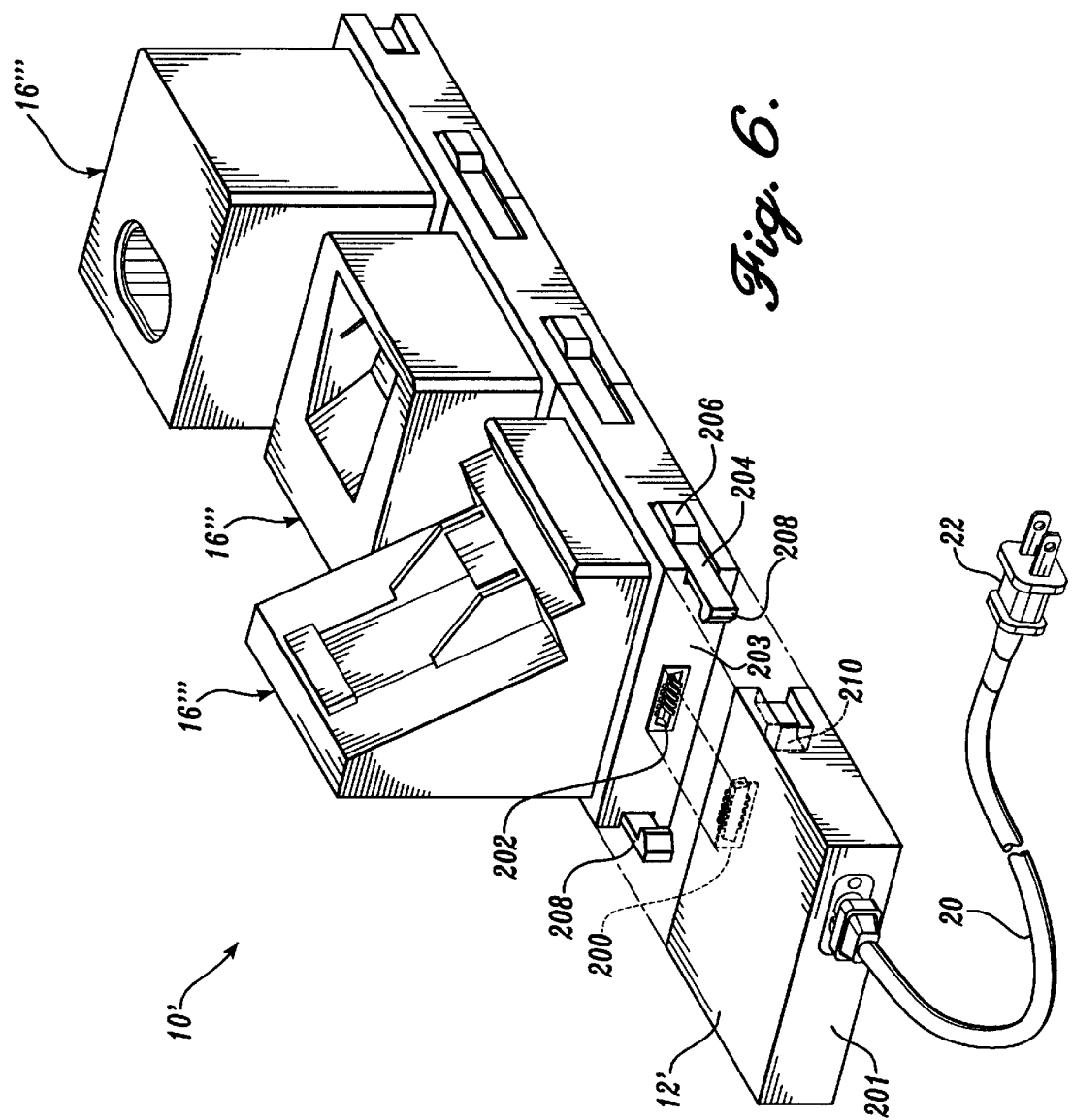
FIG. 6 is a perspective view of a second embodiment of a modular battery charging system formed in accordance with the present invention.
Figure 7:
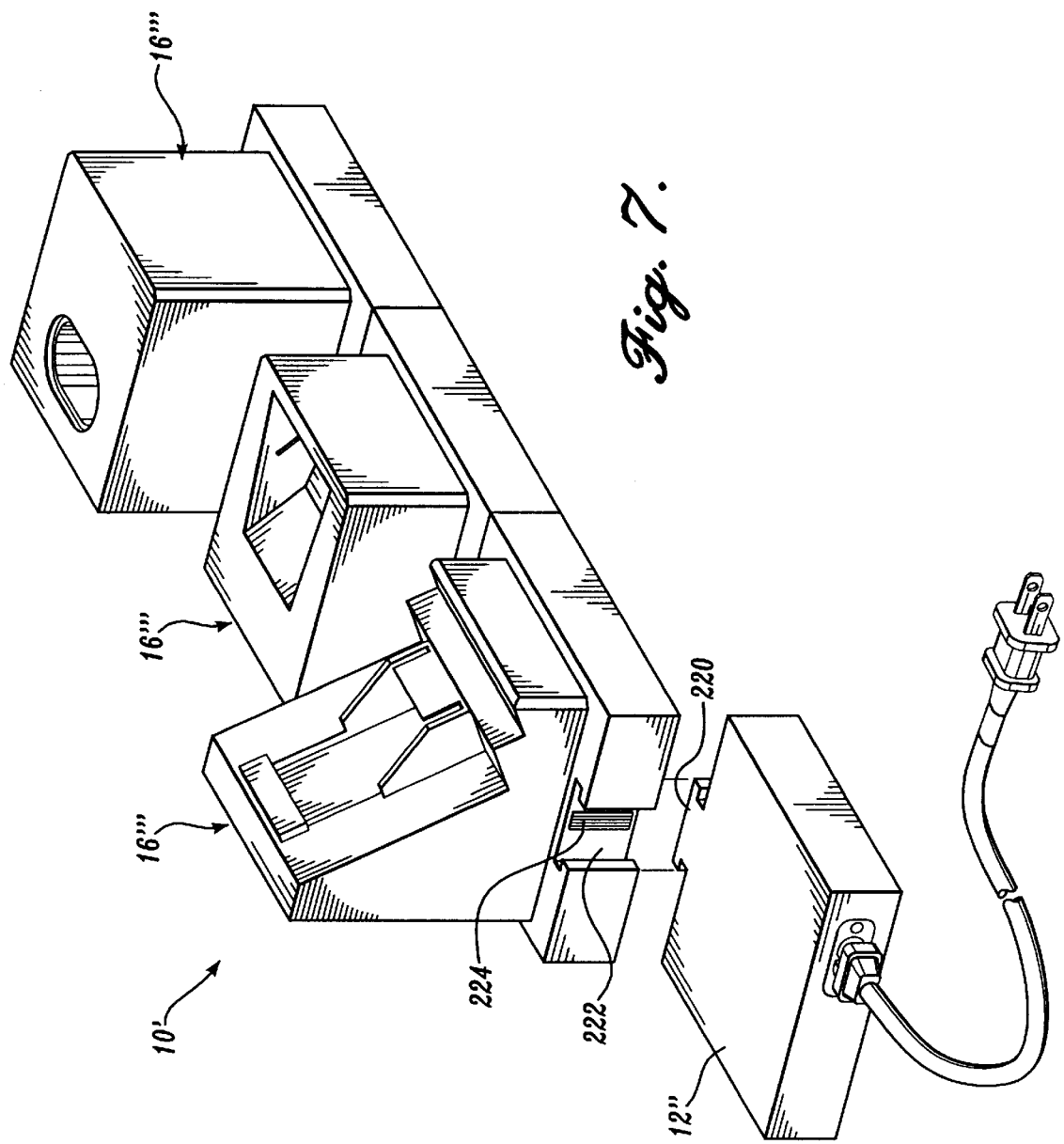
FIG. 7 is a perspective view of an alternative arrangement of a modular battery charging system formed in accordance with the present invention.

A second embodiment of a modular battery charging system 10' is provided with reference to FIGS. 6 and 7. In each of these arrangements, the modular battery charging system includes a power supply 12' and one or more battery charging modules 16'''. The track is eliminated in this embodiment. The battery charging modules 16''' are formed to connect end-to-end, thus forming an extendible "train" of battery charging modules. The embodiments of FIGS. 6 and 7 illustrate two arrangements that may be used to form such a train. Other arrangements to "couple" the modules in the train are possible within the spirit and scope of the invention.

Referring to FIG. 6, the power supply 12' is similar in form and function to the power supply 12 of the first embodiment discussed above. Instead of an output cable 24 and connector 26, however, the power supply 12' of this embodiment includes an output port 200 along one power supply side surface 201. The output port 200 is capable of receiving a mating input port 202 located in a side surface 203 of a battery charging module 16'''. Another side surface of the battery charging module includes an output port similar to output port 200, so that each battery charging module 16''' has an input port and an output port. The input port 202 of a battery charging module connects to the output port 200 of the power supply 12' or to the output port of another battery charging module. By linking one battery charging module to another via the output/input port mating connections 200/202, a "train" of battery charging modules 16''' may be formed and supplied with power from a single power supply 12' delivering a low voltage output. The mating ports 200, 202 are preferably arranged to include two voltage lines and optionally two communication data lines.

Each battery charging module 16''' is similar to the battery charging module of the first embodiment of a modular battery charging system described above, particularly with regard to the charging unit 66, housing 68, and battery receiving port 70. In contrast, however, the charging unit 66 of the battery charging module 16' receives low voltage power through an electrical path provided from the interconnection of the input port 202 to output port 200' of the battery charging module 16'''.

In addition to the mechanical connection provided by the connector of the input and output ports 200 and 202, to further ensure a secure fit between the battery charging module and the power supply, it is preferable to include some type of locking mechanism between the modules. In FIG. 6, the locking mechanism includes a lever 204 located along each battery charging module front and back sides. The levers each include a push pad 206 at one end and a hook 208 at the opposite end. The levers are rotatably connected to the battery charging module about a vertical pivot axis located mid-way along the lever. A spring (not shown) is located in the battery charging module to continuously push the lever pad end outward. This action also causes a continuous urging of the lever hook inward, i.e., toward each other. Notches 210 are formed in the side surfaces of the power supply module 12 and within the front and back side surfaces of the battery charging modules, though at the corner opposite the levers. The notches 210 are adapted to engage the lever hooks 208 of an adjacent module. To use, the modules are fitted against one another, the output/input ports 200/202 are engaged while the lever hooks 208 are snapped into their respective notches 210. To disengage the modules from the "train," the lever pads 206 are pressed to rotate the hooks out of notches 210, thus allowing the operator to release the modules from one another.

FIG. 7 shows an alternative arrangement in which a train of battery charging module modules 16''' are connected via interlocking input and output ports, or "pieces," in a jigsaw puzzle manner. The power supply includes a male piece 220 that inserts vertically into a female opening 222 formed in a battery charging module side surface. A number of contacts 224 are formed on both the male piece 220 and female opening 222 to provide an electrical path therebetween.

As will be appreciated from a reading of the above, an battery charging module formed in accordance with the present invention allows the user to charge multiple battery types from a single certified power supply. Using the track embodiment, a user can install the track to a wall or bench and can then easily add battery charging modules for any kind of new battery packs that they may acquire later. Using the train embodiment, a user need only purchase the power supply and the particular battery charging module modules needed at that time, with additional battery charging module modules being required only as later needed. Thus, the present invention battery charging system provides an efficient method of accommodating a vast array of charging needs on an as-needed basis.

Because each battery charging module is designed according to the specific mechanical and electrical requirements of a particular battery pack, there is no need to require any type of connection standard between the various batteries and battery packs. The manufacturer producing the battery and the corresponding battery charging module can easily accommodate these differences. In addition, because the production of the battery and battery charging module does not require any type of power supply or UL certification, they can be produced at a lower cost, thus lower the cost to the user as well.

While the preferred embodiment of the invention has been illustrated and described, it will be appreciated that various changes can be made therein without departing from the spirit and scope of the invention. For example, additional lines may be used. By further example, the power supply may be in communication with a control system that is capable of providing various status and safety information, e.g., audible or visible warnings regarding any system overloads, a report of the number of battery charging modules currently charging, etc. Such a control system may also be used to provide a battery status report, e.g., indicating each battery type, its remaining life, its condition, and when to order a replacement.

The embodiments of the invention in which an exclusive property or privilege is claimed are defined as follows:

1. A modular battery charging system comprising:
   (a) a power supply for converting a line voltage to a low voltage, the power supply supplying power at a voltage below a predetermined maximum voltage;
   (b) an elongated track electrically coupled to the power supply, the elongated track having at least one conductive strip extending longitudinally along the track for transmission of the low voltage power; and
   (d) at least one battery charging module electrically coupled to the elongated track to receive the low voltage power, the at least one battery charging module comprising:
      (i) a housing;
      (ii) a charging unit comprising active components controlled by logic circuit means to charge the battery according to a charging algorithm associated with the battery and the battery's chemistry, said charging unit positioned and supported within the housing;
      (iii) electrical connection components adapted to couple the low voltage power from the elongated track to the charging unit; and (iv) a battery charging device receiving port adapted to receive a battery in need of charging at position such that charging terminals of the battery are electrically coupled to the charging unit.

2. The system of claim 1, wherein the power supply has a current limiting circuit.

3. The system of claim 1, wherein the electrical connection components provide a mechanical connection that secures the battery charging module to the elongated track.

4. The system of claim 1, wherein the charging unit modifies the low voltage supplied by the power supply to a charging requirement of the battery in need of charging.

5. The system of claim 4, wherein the charging unit implements a charging algorithm specific to the battery in need of charging.

6. The system of claim 1, wherein the elongated track is made from a conducting material material and the charging unit is coupled to the elongated track for power transfer.

7. The system of claim 1, wherein the elongated track has at least one data communication strip for coupling data communication from the power supply to the at least one battery charging module.

8. The system of claim 1, wherein the logic circuit is a microprocessor.

9. A modular battery charging system comprising:
   (a) a power supply for converting a line voltage to a low voltage, the power supply supplying power at a voltage below a predefined maximum voltage, the power supply including a power supply output port;
   (b) at least one battery charging module comprising:
      (i) a housing having an electrical input port and an electrical output port;
      (ii) a charging unit comprising active components controlled by logic circuit means to charge the battery according to a charging algorithm associated with the battery and the battery's chemistry, said charging unit positioned and supported within the housing;
      (iii) electrical connection components including a first connection extending between the electrical input port and the electrical output port, and a second connection extending between the first connection and the charging unit, thereby placing the charging unit in a parallel arrangement with the first connection; and
      (iv) a battery charging device receiving port adapted to receive a battery in need of charging at a position such that charging terminals of the battery are electrically coupled to the charging unit.

10. The system of claim 9, wherein the at least one battery charging module includes a first battery charging module and a second battery charging module, an electrical input port of the first battery charging module electrically coupled to the output port of the power supply, an electrical output port of the first battery charging module electrically coupled to an electrical input port of the second battery charging module, thus forming a train of battery charging modules headed by the power supply.

11. The system of claim 9, wherein the power supply has a current limiting circuit.

12. The system of claim 9, wherein the charging unit modifies the low voltage supplied by the power supply to a charging requirement of the battery in need of charging.

13. The system of claim 12, wherein the charging unit implements a charging algorithm specific to the battery in need of charging.

14. The system of claim 9, wherein the electrical connection components include at least one data communication strip for coupling data communication from the power supply to the at least one battery charging module.

15. The system of claim 9, wherein the electric input port of one said housing and the electrical output port of another said housing interfit as do parts in a jigsaw puzzle.

16. The system of claim 15, wherein the electrical connection components provide a mechanical connection that secures a first module with a module input port to a second module that has a module output port.

17. The system of claim 9, wherein the logic circuit is a microprocessor.

* * * * *